UNITED STATES PATENT OFFICE.

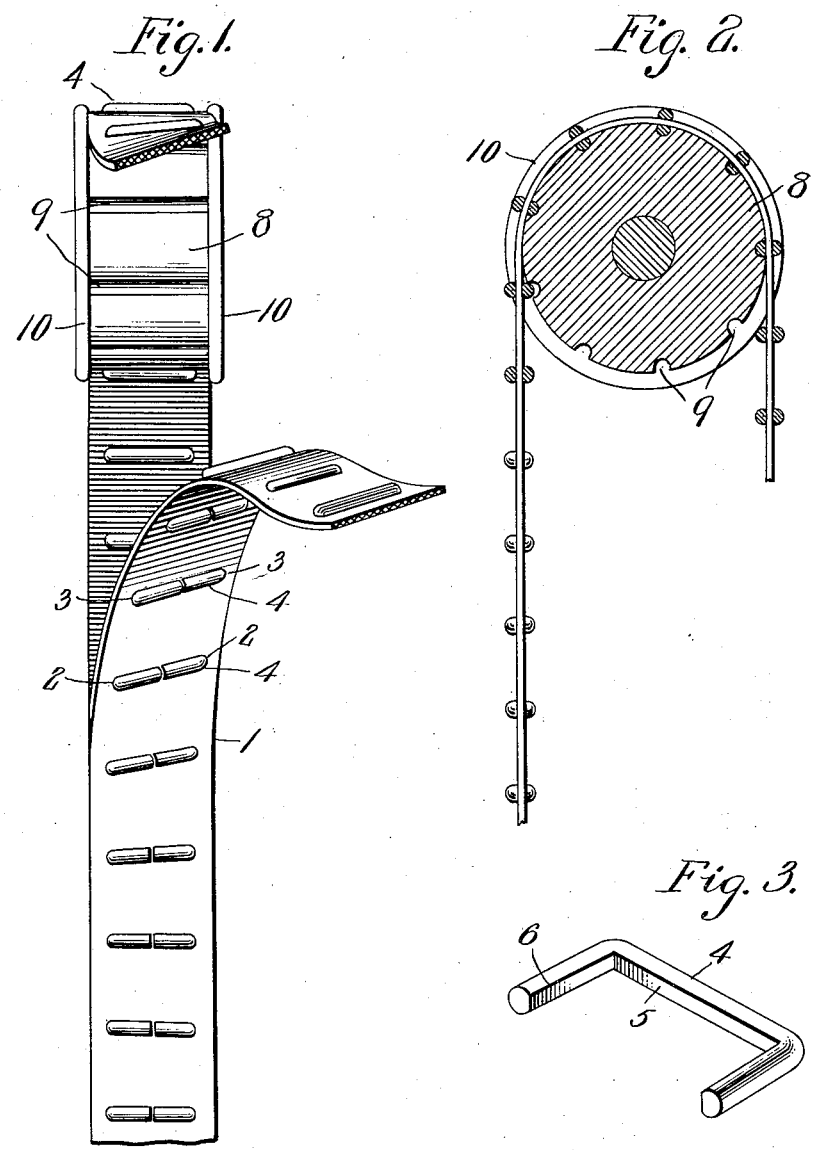

LANSING ONDERDONK, OF NEW YORK, N. Y., ASSIGNOR TO THE UNION SPECIAL MACHINE COMPANY, OF CHICAGO, ILLINOIS, A CORPORATION OF ILLINOIS.

POWER-TRANSMISSION BELT.

1,050,382.

Specification of Letters Patent.

Patented Jan. 14, 1913.

Application filed February 2, 1907. Serial No. 355,393.

*To all whom it may concern:*

Be it known that I, LANSING ONDERDONK, a citizen of the United States, residing at New York, in the county of New York, State of New York, have invented certain new and useful Improvements in Power-Transmission Belts, of which the following is a description, reference being had to the accompanying drawing and to the letters and figures of reference marked thereon.

My invention relates to new and useful improvements in belts for transmission of power and has for its object to construct a belt which shall be durable and especially adapted for high speed transmission.

A further object of my invention, is to construct a belt which shall be provided with means for preventing the same from slipping upon the pulleys, whereby a uniform regularity of motion may be transmitted from one shaft to another.

I am aware that it has been common in the art to provide belts with cleats which coöperate with grooves formed in the driving and driven pulleys in order to prevent said belt from slipping thereon. As far as I am aware, however, the said cleats have been caused to encircle the belt and where said cleats extend over the edge of the belt, it has been subject to wear and also causes considerable noise in operation. In my improved belt, I provide a series of cleats, which pass through the belt and thereby leave the edges of the belt free.

My invention consists in the arrangement of parts hereinafter shown and described.

In the drawings, which show one embodiment of my invention:—Figure 1 shows a pulley with my improved belt applied thereto, said belt being broken and turned back in order to more clearly show the construction. Fig. 2 is a sectional view of the pulley and a section of the belt coöperating therewith; and Fig. 3 is a detail perspective view of one of my cleats, before the same is applied to the belt.

My improved belt 1 is composed of leather, canvas or any other suitable material, and is preferably made the entire width of the pulley with which it coöperates. Said belt is provided throughout its entire length with a series of pairs of holes, 2—2, 3—3, etc., which holes are located at a slight distance from the edge of the belt. Passing through each pair of holes is my improved form of cleat 4. Said cleat as shown in the drawings, is U-shaped and has the under side thereof flattened as at 5. The projecting portions of the U-shaped cleat 6—6 are spaced the same distance as the holes in the belt. Said projecting ends 6—6 are passed through the holes from the inner face of the belt and then are preferably bent down upon the belt in a direction toward each other. The length of said projecting ends is such that when the said ends are bent down upon the belt, they are practically in contact. It will be obvious, however, that the projecting ends may be bent down upon the belt in any other direction, or that any other suitable way of fastening the cleats to the belt may be used in the place of the one herein described.

Coöperating with my improved form of belt is a pulley 8, which is provided throughout its entire surface with spaced grooves 9—9—9, etc. The grooves 9—9 are spaced the same distance apart as the cleats on the belt so that as said belt rotates the pulley the cleats will register with the grooves in the face of said pulley. Said pulley is also provided with flanges 10—10. The belt is preferably of a width so as to fit closely between the flanges 10—10. The cleats 4 which are preferably made of metal are located at a distance from the edge of the belt and therefore all noise which might be caused by the contact of said cleats with said flanges is avoided. By making the under side of the cleat and also the projecting ends flat, the cleat will lie close to the belt and all liability of cutting the belt by the rounded edge of the cleat is avoided. It will be further noted that the cleats by being passed through the belt are held from movement longitudinally of the belt.

While I have shown the holes for the cleats as spaced a considerable distance from the edge of the belt, it will be obvious that the holes may be at the edge, or the edge of the belt may be notched for the reception of the cleats, the main feature being to have the cleats pass through the belt so as to be held from movement relative to the belt, and also to space the cleats a sufficient distance from the edge to avoid contact thereof with the flange of the pulleys. When the cleats encircle the belt, as has been the custom in the prior art, they are liable to slip out of place under sudden strain unless they are compressed very tightly on the belt. Furthermore, when compressed on the belt tight enough to prevent slipping the cleats are apt to cut the belt or cause it to break at the cleat. In leather or fiber belts it is, of course, impossible to secure by soldering as is done with wire cable belts, but by passing the cleats through the belt it will be firmly held in place, so that they cannot slip and it is not necessary to clamp the belt so tight as to injure the same.

Having thus particularly described my invention, what I claim as new and desire to secure by Letters Patent, is:

1. A belt for the transmission of power, composed of leather, canvas or the like, U-shaped cleats arranged equi-distant upon said belt and having their ends extending through said belt at points distant from its edge, said ends being bent toward each other and against the outer face of the belt, combined with a pulley having correspondingly spaced grooves coöperating with said cleats there being flanges at the side faces of said pulley.

2. The combination with a pulley having flanges for retaining a belt thereon, and a transmission belt engaging said pulley between the flanges and extending substantially from one flange to the other, cleats carried by the belt and extending transversely thereof, said cleats terminating short of the side edges of the belt, whereby non-sounding material is interposed between the ends of the cleats and the flanges of the pulley, said pulley having spaced grooves therein to receive the cleats.

3. The combination of a pulley having flanges thereon, and parallel spaced grooves extending transversely of the pulley, and a transmission belt composed of leather, canvas or the like, engaging said pulley and extending substantially from one flange to the other, spaced cleats having projecting portions passing through said belt at points between the side edges of the belt, whereby a non-sounding portion of the belt engages the flange of the pulley, the projecting portions of the cleats being bent down upon the outer face of the belt to retain the cleats thereon, said cleats having flat under faces and being spaced to correspond with the grooves in the pulley.

In testimony whereof I affix my signature, in presence of two witnesses.

LANSING ONDERDONK.

Witnesses:
JOHN A. CARLSON,
CHARLES H. COCKS.